(12) United States Patent
Kim (10) Patent No.: US 8,450,975 B2
(45) Date of Patent: May 28, 2013

(54) BATTERY PACK WITH A SHIPPING MODE

(75) Inventor: Jinwan Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 363 days.

(21) Appl. No.: 12/832,955

(22) Filed: Jul. 8, 2010

(65) Prior Publication Data

US 2011/0057622 A1    Mar. 10, 2011

(30) Foreign Application Priority Data

Sep. 8, 2009   (KR) .................. 10-2009-0084429

(51) Int. Cl.
*H01M 10/46*   (2006.01)

(52) U.S. Cl.
USPC .......................... 320/134; 320/136

(58) Field of Classification Search
USPC ............... 320/107, 112, 132, 134, 135, 136, 320/149
See application file for complete search history.

(56) References Cited

U.S. PATENT DOCUMENTS

| | | | |
|---|---|---|---|
| 5,477,130 A | 12/1995 | Hashimoto et al. | |
| 5,801,514 A | 9/1998 | Saeki et al. | |
| 5,959,368 A * | 9/1999 | Kubo et al. | 320/102 |
| 6,492,791 B1 | 12/2002 | Saeki et al. | |
| 2007/0229026 A1 | 10/2007 | Morioka et al. | |
| 2008/0012532 A1* | 1/2008 | Denning | 320/134 |
| 2009/0208821 A1 | 8/2009 | Kosugi et al. | |

FOREIGN PATENT DOCUMENTS

| | | |
|---|---|---|
| EP | 1 533 882 A2 | 5/2005 |
| JP | 02-294235 A | 12/1990 |
| JP | 07-029554 | 1/1995 |
| JP | 08-079982 | 3/1996 |
| JP | 11-339862 A | 12/1999 |
| JP | 2002-190327 A | 7/2002 |
| JP | 2002-272008 A | 9/2002 |
| KR | 1020000076890 | 12/2000 |
| WO | WO 03/073581 AI | 9/2003 |

OTHER PUBLICATIONS

English Machine Translation of JP Patent No. 11-339862 dated Dec. 10, 1999, 12 pages.
English Machine Translation of JP Publication No. 2002-190327 dated Jul. 5, 2002, 6 pages.
Office action dated Jun. 19, 2012 issued by the Japanese Patent Office corresponding to JP Publication No. 2010-135471, 1 page.
Extended European Search Report dated Dec. 30, 2010, in corresponding European Application No. 10251564.0, 7 pages.
Korean Office Action dated Feb. 24, 2011 issued by KIPO corresponding to JP 2002-272008A.
English machine translation of JP 2002-272008A.

* cited by examiner

*Primary Examiner* — Edward Tso
(74) *Attorney, Agent, or Firm* — Christie, Parker & Hale, LLP (57) ABSTRACT

In a battery pack, undesired current consumption is reduced during a shipping period to extend the charge keeping time of the battery pack. The battery pack includes at least one of battery cells, a charge switch, a discharge switch, and a microcomputer for controlling the charge switch and the discharge switch in accordance with a voltage of the battery cells. The battery pack has a shipping mode where the battery pack is shut down during the shipping period.

17 Claims, 4 Drawing Sheets

BATTERY PACK WITH A SHIPPING MODE

CROSS-REFERENCE TO RELATED APPLICATION

This application claims priority to and the benefit of Korean Patent Application No. 10-2009-0084429 filed on Sep. 8, 2009, the entire content of which is incorporated herein by reference.

BACKGROUND

1. Field

An aspect of the present invention relates to a battery pack.

2. Description of the Related Art

Recently, compact and light portable electronic/electric apparatuses such as a cellular phone, a laptop computer, and a camcorder are actively developed and produced. Battery packs are built in the portable electronic/electric apparatuses so that the portable electronic/electric apparatuses may operate in places where power sources are not provided. Battery packs using economical rechargeable secondary batteries such as a nickel-cadmium (Ni—Cd) battery, a nickel-metal hydride (Ni-MH) battery, and a lithium (Li) battery are commonly used.

Among the battery packs, the battery pack using the lithium secondary battery has an operating voltage three times higher than that of the battery pack using the Ni—Cd battery or the Ni-MH battery and has a high energy density per unit weight so that the battery pack using the lithium secondary battery is widely used in the portable electronic/electric apparatuses. The lithium secondary battery is classified as a lithium ion battery that uses liquid electrolyte and a lithium-polymer battery that uses polymer electrolyte in accordance with the kind of electrolyte used. Further, the lithium secondary battery is classified as a cylindrical type battery, a prismatic type battery, and a pouch type battery in accordance with a manufactured shape.

Generally, the battery pack using the lithium secondary battery includes a bare cell, a protective circuit board electrically connected to the bare cell to prevent the overcharge and over-discharge of the bare cell. In order to fix the bare cell to the protective circuit board, in general, a molding process of filling a space between the bare cell and the protective circuit board with a molding material such as resin or hot melt is performed. The bare cell is formed by accommodating an electrode assembly in a can having a top opening and by sealing the top opening of the can by a cap assembly. The electrode assembly includes a positive electrode plate and a negative electrode plate each having an electrode tab connected to a collector coated with electrode active materials and a separator positioned between the positive electrode plate and the negative electrode plate.

The battery pack is charged with a preset capacity and shipped. When an end user uses the battery pack for the first time after a shipping period, the user may use the battery pack without charging the battery pack. The shipping period is defined by a time period from the time when the manufacturing of the battery pack is completed and shipped to the time when the end user mounts the battery pack in an apparatus. That is, the shipping period of the battery pack is from the time when the battery pack is shipped to the time when the end user purchases the battery pack in order to mount the same in the apparatus. However, the shipping periods of the battery packs may be variable. When the shipping period of the battery pack is extended, since the charged battery pack may be completely discharged due to internal current consumption of the battery pack, the end user must recharge the battery pack before the first use.

SUMMARY

An aspect of the present invention relates to a battery pack configured to be shut down by a switch mounted on the outside of the battery pack so that the current consumption during a shipping period may be reduced and a charge keeping time of the battery pack may be extended.

Another aspect of the present invention relates to a battery pack having a microcomputer that is continuously turned off to prevent malfunctioning of the battery pack from occurring in a shipping period and to improve stability of the battery pack.

In accordance with an embodiment of the present invention, a battery pack includes at least one of battery cells, a charge switch, a discharge switch, and a microcomputer for controlling the charge switch and the discharge switch in accordance with a voltage of the battery cells. The battery pack has a shipping mode (or ship mode) in which the battery pack is configured to be shut down.

The battery pack may further include a mode switch electrically connected to the microcomputer, wherein the battery pack is configured to enter the shipping mode through operation of the mode switch.

A remaining capacity of the battery cells may be checked by operating the mode switch.

The charge switch and the discharge switch may be configured to be turned off when the battery pack is in the shipping mode.

When the battery pack is in the shipping mode, a current consumption of the battery pack may be between about 2 uA/hr and about 3 uA/hr.

The battery pack may further include a current probe connected to a first power terminal of the battery pack or a current meter connected between the battery cells and a ground, for measuring the current consumption of the battery pack.

In accordance with another embodiment of the present invention, a battery pack includes at least one of battery cells, a charge switch, a discharge switch, a microcomputer for controlling the charge switch and the discharge switch in accordance with a voltage of the battery cells, and a mode switch for concurrently turning off the charge switch and the discharge switch.

The microcomputer may be configured to operate with an electric power supplied from a charger when the battery pack is coupled to the charger and turns on the charge switch and the discharge switch so that the battery pack is in a normal mode.

When the battery pack is in a shipping mode, the battery pack may be shut down.

When the battery pack is in the shipping mode, a current consumption of the battery pack may be an amount of self-discharge current that flows through the battery cells in the shipping mode.

In accordance with still another embodiment of the present invention, a battery pack includes at least one of battery cells, a mode switch, a discharge switch electrically connected to the battery cells for controlling discharge of the battery cells, a charge switch electrically connected to the discharge switch for controlling charging of the battery cells, and a microcomputer for analyzing codes in accordance with on and off operations of the mode switch to control on and off of the discharge switch and the charge switch.

The battery pack may further include a light emitting diode unit configured to be turned on in accordance with a switching operation of the mode switch to display a remaining capacity of the battery cells.

The microcomputer may include a switching sensor for sensing a switching signal of the mode switch, a light emitting diode (LED) driver for driving the light emitting diode unit in accordance with the switching signal sensed by the switching sensor to emit light, a code analyzer for analyzing the switching signal of the mode switch, a mode setting unit for setting a mode of the battery pack in accordance with a result analyzed by the code analyzer, a switching driver for operating the charge switch and the discharge switch in accordance with the mode set by the mode setting unit, and a controller for controlling the LED driver to generate a lighting signal of the light emitting diode unit in accordance with the signal sensed by the switching sensor, controlling the mode setting unit in accordance with the result analyzed by the code analyzer, and controlling the switching driver in accordance with the mode set by the mode setting unit.

The microcomputer may further include a sensor for sensing voltage, current, and temperature of the battery cells, a remaining capacity estimator for estimating the remaining capacity of the battery cells in accordance with the voltage, current, and temperature sensed by the sensor, and a memory for storing the voltage, current, and temperature sensed by the sensor.

The controller may be configured to set the mode of the battery pack to a shipping mode by utilizing the mode setting unit when a code analyzed by the code analyzer is equal to a code stored in the controller.

The controller may be configured to turn off the discharge switch and the charge switch by utilizing the switch driver when the battery pack is in the shipping mode.

The battery pack may be in a sleep mode when the charge switch and the discharge switch are turned on.

In the sleep mode, an electric power is supplied to the microcomputer from the battery cells via the discharge switch and the charge switch.

In a battery pack according to the embodiments of the present invention, since the battery pack may be shut down by the switch mounted on the outside of the battery pack, the current consumption of the battery pack may be reduced during the shipping period and a charge keeping time of the battery pack may be extended.

In the battery pack according to the embodiments of the present invention, since the microcomputer is kept being turned off, malfunctioning of the battery pack may be prevented and stability may be improved.

BRIEF DESCRIPTION OF THE DRAWINGS

The aspects and features of the present invention will be more apparent from the following detailed description in conjunction with the accompanying drawings, in which.

DETAILED DESCRIPTION

Hereinafter, exemplary embodiments of the present invention will be described in detail with reference to the accompanying drawings such that those skilled in the art may practice the present invention. Similar elements are assigned with the same reference numerals throughout the description.

Figure 1:
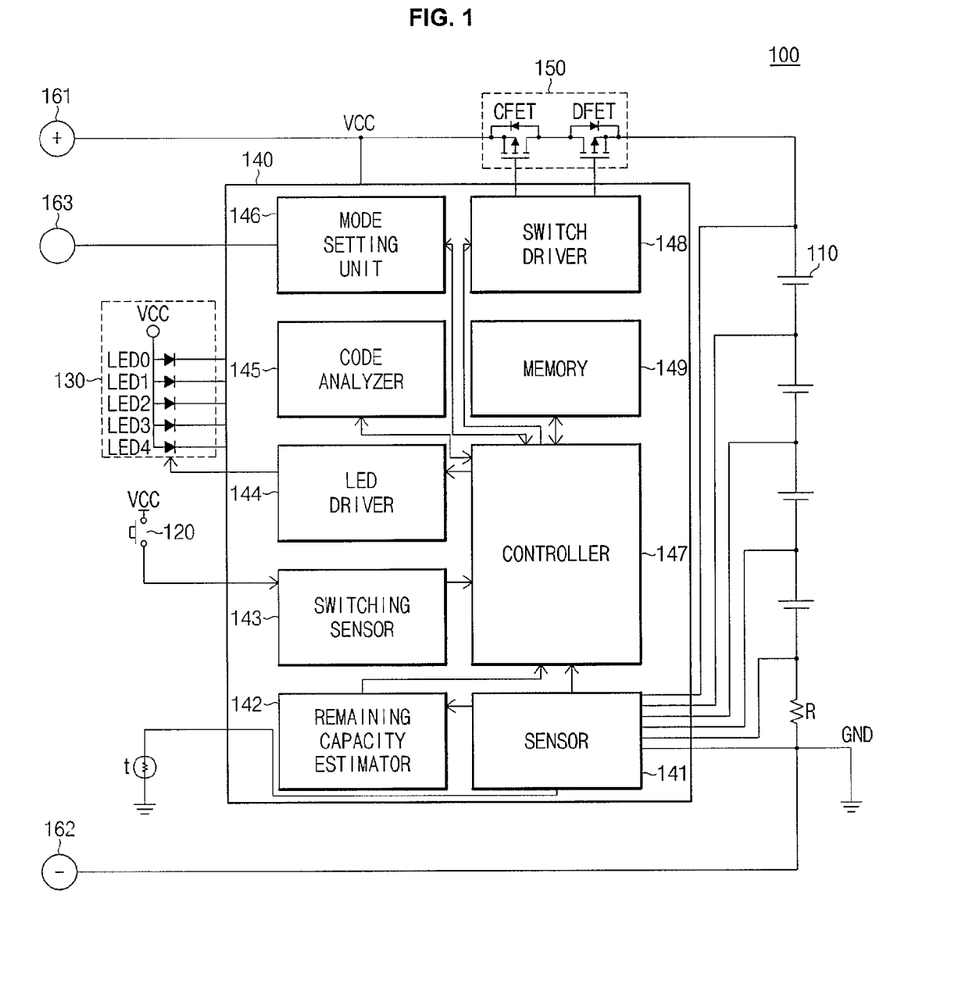
FIG. 1 is a schematic block diagram illustrating a battery pack according to an embodiment of the present invention.

Referring to FIG. 1, a schematic block diagram of a battery pack according to an embodiment of the present invention is illustrated.

As illustrated in FIG. 1, a battery pack 100 include battery cells 110, a mode switch 120, a light emitting diode (LED) unit 130, a microcomputer 140, and charge and discharge switches 150. The charge and discharge switches 150 include a charge switch CFET and a discharge switch DFET. The battery pack 100 further include a current sense resistor R for sensing current that flows through the battery cells 110 and a temperature sensor t for measuring temperature. The battery pack 100 further include a positive electrode terminal 161 for the charge and discharge of the battery cells 110, a negative electrode terminal 162 for the charge and discharge of the battery cells 110, and a communication terminal 163 for performing communications with an external apparatus. The positive electrode terminal 161 is electrically connected to the positive electrode of the battery cells 110. The negative electrode terminal 162 is electrically connected to the negative electrode of the battery cells 110. The communication terminal 163 is electrically connected to the microcomputer 140.

The plurality of battery cells 110 may be serially connected to each other. There is no particular limit to the number of the battery cells 110. The battery cells 110 may be lithium ion battery cells that are chargeable to about 4.2 V, but the present invention is not limited to the above. The battery cells 110 are electrically connected to the charge and discharge switches 150 and the microcomputer 140.

The mode switch 120 may be turned on or off. Although the mode switch 120 may be a push button switch mounted on the outside of the battery pack 100 to be turned on or off, the present invention is not limited to the above. The mode switch 120 is electrically connected to the microcomputer 140. The mode switch 120 transmits ON and OFF signals to the microcomputer 140 in an ON and OFF operation. The mode switch 120 mounted on the outside of the battery pack 100 may set the operating mode of the battery pack 100 through the ON and OFF operation. The mode switch 120 may be used as a switch for controlling the operation of the LED unit 130. When the mode switch 120 is turned on, the remaining capacity of the battery may be checked through the LED unit 130. That is, the mode switch 120 may be used to check the remaining capacity of the battery.

The LED unit 130 may include an arrangement of a plurality of light emitted diodes. That is, the LED unit 130 may include the LEDs arranged in a line or lines. The LED unit 130 is electrically connected to the microcomputer 140. When the mode switch 120 is turned on, the LED unit 130 may turn on the LEDs according to signals applied from the microcomputer 140. The signals applied from the microcomputer 140 may be generated by the ON and OFF operations of the mode switch 120. The LED unit 130 is mounted on the outside of the battery pack 100 and emits light with a number of lit LEDs corresponding to the remaining capability of the battery cells 110 when the mode switch 120 is turned on. That is, the LED unit 130 may display the remaining capability of the battery cells 110 by a number of light emitting LEDs.

The microcomputer 140 may be various kinds of suitable microcomputers manufactured for the lithium ion battery, but the present invention is not limited to the above. The microcomputer 140 is electrically connected to the battery cells 110, the mode switch 120, the LED unit 130, and the charge and discharge switches 150. The microcomputer 140 analyze codes in accordance with the ON and OFF operations of the mode switch 120 to control the ON and OFF operations of the charge and discharge switches 150, and set the operating mode of the battery pack 100. The microcomputer 140 may include a sensor 141, a remaining capacity estimator 142, a switching sensor 143, a light emitted diode (LED) driver 144, a code analyzer 145, a mode setting unit 146, a controller 147, a switch driver 148, and a memory 149.

The sensor 141 is electrically connected to the remaining capacity estimator 142 and the controller 147. The sensor 141 senses the voltage, current, and temperature of the battery cells 110. That is, the sensor 141 senses the voltage between both ends of each of the battery cells 110, senses the temperature using the temperature sensor t, and senses the current using the current sense resistor R. The sensor 141 transmits the sensed voltage, current, and temperature to the remaining capacity estimator 142 and the controller 147.

The remaining capacity estimator 142 is electrically connected to the sensor 141 and the controller 147. The remaining capacity estimator 142 estimates the remaining capacity of the battery cells 110 in accordance with the voltage, current, and temperature of the battery cells 110 sensed by the sensor 141. The remaining capacity estimator 142 transmits the estimated remaining capacity of the battery cells 110 to the controller 147.

The switching sensor 143 is electrically connected to the mode switch 120 and the controller 147. The switching sensor 143 senses the ON and OFF operations of the mode switch 120. The switching sensor 143 sends an ON and OFF signals corresponding to the ON and OFF operations of the mode switch 120 to the controller 147.

The LED driver 144 is electrically connected to the LED unit 130 and the controller 147. When the mode switch 120 is turned on, the LED driver 144 receives an ON signal applied from the controller 147 to drive the LED unit 130. The LED driver 144 drives the LED unit 130 to correspond to the remaining capacity of the battery cells 110 provided by the controller 147. That is, the LED driver 144 drives the LED unit 130 to emit light with a number of LEDs of the LED unit 130, corresponding to the remaining capacity of the battery cells 110.

The code analyzer 145 is electrically connected to the controller 147. The code analyzer 145 receives the ON and OFF signals of the mode switch 120 sensed by the switching sensor 143 from the controller 147 and codes the ON and OFF signals and analyzes the coded ON and OFF signals. The code analyzer 145 provides the analyzed code to the controller 147. The controller 147 compares the analyzed code with a code previously stored in the memory 149. The code analyzer 145 is controlled by the mode switch 120, which will be described in more detail with reference to FIG. 2 that is the operation timing diagram of the mode switch 120.

The mode setting unit 146 is electrically connected to the controller 147. The mode setting unit 146 receives the result obtained by comparing the code provided by the code analyzer 145 with the code previously set by the controller 147 to set a mode. The mode setting unit 146 may have a normal mode, a sleep mode, and a shipping mode. The normal mode is a common (or normal) operating mode, in which the battery pack 100 may perform charge and discharge. The sleep mode is a mode in which the battery pack 100 is on standby. In the shipping mode, the battery pack 100 is in a shut-down state where the operation of the battery pack 100 is stopped. The mode setting unit 146 may set the mode to the shipping mode so that the battery pack 100 is shut down when the code stored in the memory 149 is the same as the code applied by the code analyzer 145. That is, the operating mode of the battery pack 100 may be set through the mode switch 120 mounted on the outside of the battery pack 100.

The controller 147 is electrically connected to the sensor 141, the remaining capacity estimator 142, the switching sensor 143, the LED driver 144, the code analyzer 145, the mode setting unit 146, the switch driver 148, and the memory 149. The controller 147 receives information on the voltage, temperature, and current of the battery cells 110 sensed by the sensor 141 and store the information on the received voltage, temperature, and current in the memory 149. The controller 147 provides information on the remaining capacity of the battery cells 110, supplied from the remaining capacity estimator 142, to the LED driver 144 to display the remaining capacity of the battery cells 110 through the LED unit 130. When the switching sensor 143 senses that the mode switch 120 is turned on, the controller 147 drives the LED unit 130 through the LED driver 144 to emit light. The controller 147 converts the ON and OFF signals of the mode switch 120 sensed by the switching sensor 143 into signals in accordance with the timing of the ON and OFF signals and applies the converted signals to the code analyzer 145. The code analyzer 145 codes and analyzes the converted signals supplied from the controller 147 to generate ON and OFF codes of the mode switch 120, and the controller 147 receives the ON and OFF codes of the mode switch 120 from the code analyzer 145. The controller 147 compares the ON and OFF codes of the mode switch 120 supplied from the code analyzer 145 with the codes previously stored in the memory 149. The controller 147 applies a mode setting signal to the mode setting unit 146 to set a mode in accordance with the codes. The controller 147 turns on or off the charge and discharge switches 150 through the switch driver 148 so that the battery pack 100 operates in the mode set by the mode setting unit 146. That is, the controller 147 controls the LED driver 144, the code analyzer 145, the mode setting unit 146, and the switch driver 148 in accordance with the signals supplied by the sensor 141, the remaining capacity estimator 142, the switching sensor 143, the code analyzer 145, and the mode setting unit 146.

The switch driver 148 is electrically connected to the controller 147 and the charge and discharge switches 150. The switch driver 148 receives the signal in accordance with the mode set by the mode setting unit 146 through the controller 147 to drive the charge and discharge switches 150. When the mode set by the mode setting unit 146 is the normal mode or the sleep mode, the switch driver 148 turns on the charge switch CFET and the discharge switch DFET. When the charge switch CFET and the discharge switch DFET are turned on, the battery pack 100 is in the sleep mode. In the sleep mode, an electric power may be supplied to the microcomputer 140 from the battery cells 110 via the discharge switch DFET and the charge switch CFET. The modes of the battery pack 100 change from the sleep mode to the normal mode at preset time intervals. That is, the mode of the battery pack 100 changes from the sleep mode, which is the standby state, to the normal mode where the microcomputer 140 operates in a preset time period. Therefore, the current consumption of the battery pack 100 in the normal mode may be equal to or larger than the current consumption of the battery pack 100 in the sleep mode. When the mode set by the mode setting unit 146 is the shipping mode, the switch driver 148 turns off the charge switch CFET and the discharge switch DFET. That is, as described above, the switch driver 148 turns on or off the charge and discharge switches 150 so that the battery pack 100 operates in accordance with the mode set by the mode setting unit 146.

The memory 149 is electrically connected to the controller 147. The memory 149 may store information on the voltage, current, and temperature of the battery cells 110 sensed by the sensor 141, which are supplied through the controller 147. The memory 149 may store information on the remaining capacity of the battery cells 110 in accordance with the voltage, current, and temperature of the battery cells 110. The memory 149 store a suitable code for setting the mode of the battery pack 100. When the battery pack 100 is mounted (or installed) in an apparatus, the memory 149 transmits the information on the stored remaining capacity of the battery cells 110 to the apparatus so that the remaining capacity of the battery cells 110 may be displayed by the apparatus.

The respective control electrodes of the charge and discharge switches 150 are electrically connected to the switch driver 148. That is, the charge and discharge switches 150 may be turned on or off by the signals applied from the switch driver 148. The charge switch CFET has a first electrode (e.g., source) electrically connected to charge and discharge terminals and a second electrode (e.g., drain) electrically connected to the discharge switch DFET. The discharge switch DFET has a first electrode electrically connected to the battery cells 110 and a second electrode electrically connected to the second electrode of the charge switch CFET. In one embodiment, the charge switch CFET and the discharge switch DFET are field effect transistors, and internal parasitic diodes may be formed from the second electrodes to the first electrodes of the switches CFET and DFET. The charge switch CFET and the discharge switch DFET may be turned on or off to prevent overcharge and over discharge. The charge switch CFET and the discharge switch DFET set the mode of the battery pack 100 in accordance with the code analyzed through the operation of the mode switch 120 mounted on the outside of the battery pack 100. That is, the mode setting of the battery pack 100 may be easily changed by the externally mounted mode switch 120.

When the battery pack 100 is in the sleep mode or the normal mode, the charge switch CFET and the discharge switch DFET are turned on. Therefore, current may flow through the inside of the battery pack 100 via the charge switch CFET and the discharge switch DFET. However, in the shipping mode, the charge switch CFET and the discharge switch DFET are turned off, and only self-discharge current may flow between the microcomputer 140 and the battery cells 110.

Therefore, the battery pack 100 is kept from being discharged while the microcomputer 140 is turned off so that malfunctions of the battery pack 100 are prevented during the shipping period and stability of the battery pack 100 may be improved. In general, the current consumption of the battery pack 100 is 200 to 300 uA/hr in the normal mode or in the sleep mode and is 2 to 3 uA/hr in the shipping mode, which is the shutdown state. That is, the current consumption of the battery pack 100 in the shipping mode is smaller than that of the current consumption of the battery pack 100 in the normal mode or in the sleep mode.

The operating mode of the battery pack 100 may be changed to the shipping mode through the mode switch 120 mounted on the outside of the battery pack 100 when the battery pack 100 is shipped. Therefore, undesired current consumption may be prevented when the battery pack 100 is in the normal mode or in the sleep mode so that the charge keeping time of the battery pack 100 may be extended during the shipping period. The shipping period is from the point of time when the manufacturing of the battery pack 100 is completed to the point of time when an end user mounts the battery pack 100 in an apparatus. When the battery pack 100 is mounted in the apparatus, the charge switch CFET and the discharge switch DFET are turned on so that the operating mode may change. For example, when the battery pack 100 is coupled to a charger, the microcomputer 140 built in the battery pack 100 receives an electric power from the charger to operate and the microcomputer 140 turns on the charge switch CFET and the discharge switch DFET so that the battery pack 100 is in the normal mode.

Figure 2:
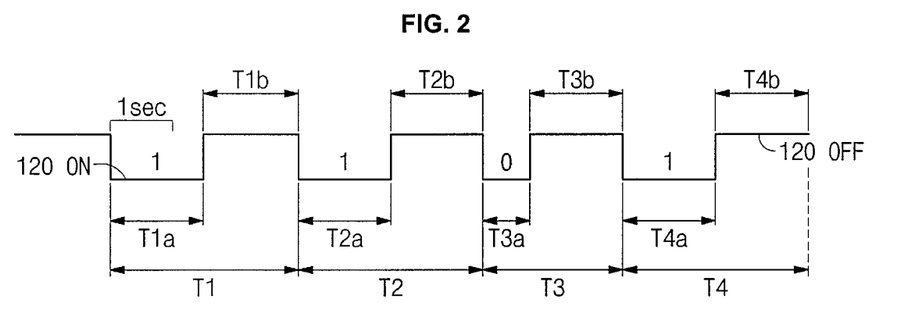
FIG. 2 is a timing diagram illustrating the operation of a mode switch of FIG. 1 according to an embodiment of the present invention.

Referring to FIG. 2, an example of an operation timing diagram of the mode switch of FIG. 1 is illustrated.

As illustrated in FIG. 2, the operation timing diagram of the mode switch 120 includes a first period T1, a second period T2, a third period T3, and a fourth period T4. The first period T1 to the fourth period T4 include driving periods T1$a$, T2$a$, T3$a$, and T4$a$ and delay periods T1$b$, T2$b$, T3$b$, and T4$b$.

The mode switch 120 is turned on for the driving periods T1$a$, T2$a$, T3$a$, and T4$a$, which are low levels in the timing diagram, and is turned off for the delay periods T1$b$, T2$b$, T3$b$, and T4$b$, which are high levels in the timing diagram. When the mode switch 120 is turned on, the timer of the microcomputer 140 may operate in order to measure the time for which the mode switch 120 is turned on.

The delay periods T1$b$, T2$b$, T3$b$, and T4$b$ are periods for preventing recognition errors for the driving periods T1$a$, T2$a$, T3$a$, and T4$a$ and errors caused by the operation delay of the microcomputer 140. Since the mode switch 120 is already turned on at the driving periods T1$a$, T2$a$, T3$a$, and T4$a$, the LED unit 130 may continuously emit light for the delay periods T1$b$, T2$b$, T3$b$, and T4$b$. The delay periods T1$b$, T2$b$, T3$b$, and T4$b$ may be set as about, e.g., five seconds in order to prevent errors caused by the operation delay of the microcomputer 140. However, the present invention is not limited to the above. FIG. 2 shows reduced delay periods T1$b$, T2$b$, T3$b$, and T4$b$.

The driving periods T1$a$, T2$a$, T3$a$, and T4$a$ are coded to "1" when the time, for which the mode switch 120 is turned on, is no less than one second and are coded to "0" when the time, for which the mode switch 120 is turned on, is less than one second. The ON and OFF of the mode switch 120 are coded by the code analyzer 145.

In the timing diagram of the mode switch 120, the first driving period T1$a$ of the first period T1, the second driving period T2$a$ of the second period T2, and the fourth driving period T4$a$ of the fourth period T4 that are no less than one second, are coded to "1". In the timing diagram of the mode switch 120, the third driving period T3$a$ of the third period T3 that is less than one second is coded to "0."

Therefore, the ON and OFF operations of the mode switch 120 illustrated in the timing diagram in FIG. 2 are coded to "1101." When the code stored in the memory 149 of the microcomputer 140 is "1101," the battery pack 100 may be set in the shipping mode so that the battery pack 100 is in the shut-down state. When the code stored in the memory 149 of the microcomputer 140 is another code excluding "1101," a current mode may be maintained.

In one embodiment, the timing diagram of the mode switch 120 is analyzed as a 4-bit digital signal, but the present invention is not limited to the above. That is, suitable signals for changing the mode of the battery pack 100 to the shipping mode may be set variously by operating the mode switch 120 many times so that the signals may be distinguished from a signal for simply driving the LED unit 130.

Figure 3:
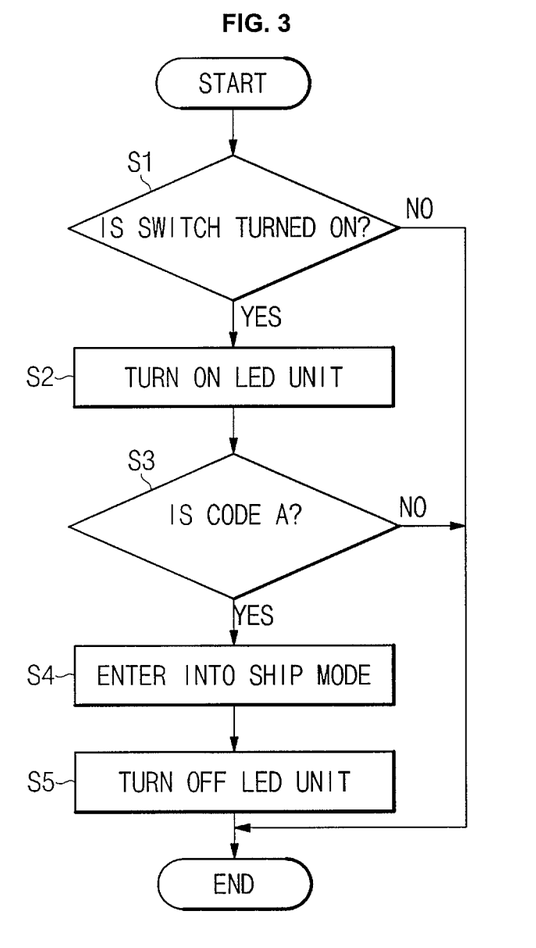
FIG. 3 is a flowchart illustrating a method of changing the operating mode of the battery pack of FIG. 1 according to an embodiment of the present invention.

Referring to FIG. 3, a flowchart illustrating a method of changing the operating mode of the battery pack of FIG. 1, according to one embodiment, is illustrated.

As illustrated in FIG. 3, the method of changing the operating mode of the battery pack includes sensing a switch operation (S1), turning on the LED unit (S2), analyzing a code (S3), entering into a shipping mode (S4), and turning off the LED unit (S5).

In sensing the switch operation (S1), the operation of the mode switch 120 is sensed by the switching sensor 143. Then, the method proceeds from sensing the switch operation (S1) to turning on the LED unit (S2) when the mode switch 120 is turned on, and terminates without changing the operating mode when the mode switch 120 is turned off.

In turning on the LED unit (S2), the LED unit 130 emits light to correspond to the remaining capacity of the battery cells 110. That is, in turning on the LED unit (S2), since the mode switch 120 is turned on in the above described sensing the switch operation (S1), the LED driver 144 drives the LED unit 130 to emit light.

In analyzing the code (S3), the ON and OFF operations of the mode switch 120 are coded. That is, the ON and OFF operations of the mode switch 120 are provided to the code analyzer 145 under the control of the controller 147 such that the code analyzer 145 codes and analyzes the ON and OFF operations of the mode switch 120. When the mode switch 120 is turned on, the period of time for which the mode switch 120 is turned on may be measured by using the timer of the controller 147. The code analyzer 145 analyzes the period of time for which the mode switch 120 is turned on and determines different codes for the period of time that is longer than a preset time and the period of time that is shorter than the preset time. The controller 147 compares a previously stored code A with the code determined by the code analyzer 145. The method proceeds from analyzing the code (S3) to entering into the shipping mode (S4) when the code determined by the code analyzer 145 is the same as the code A, or terminates without changing a mode when the code determined by the code analyzer 145 is different from the code A.

In entering into the shipping mode (S4), when the code determined by the code analyzer 145 is the same as the code A stored in the memory 149, the mode of the battery pack 100 is changed to the shipping mode. The controller 147 turns off the charge switch CFET and the discharge switch DFET through the switch driver 148. Therefore, malfunction of the battery pack 100 may be prevented when the battery pack 100 is shipped and stability of the battery pack 100 may be improved. In the shipping mode, the battery pack 100 is in the shut-down state where the operation of the battery pack 100 is stopped. That is, the operating mode of the battery pack 100 may be set through the mode switch 120 mounted on the outside thereof.

In turning off the LED unit (S5), the battery pack 100 is in the shipping mode, and the microcomputer 140 is turned off so that the LED unit 130, which is turned on in turning on the LED unit (S2) to emit light, is turned off.

Figure 4:
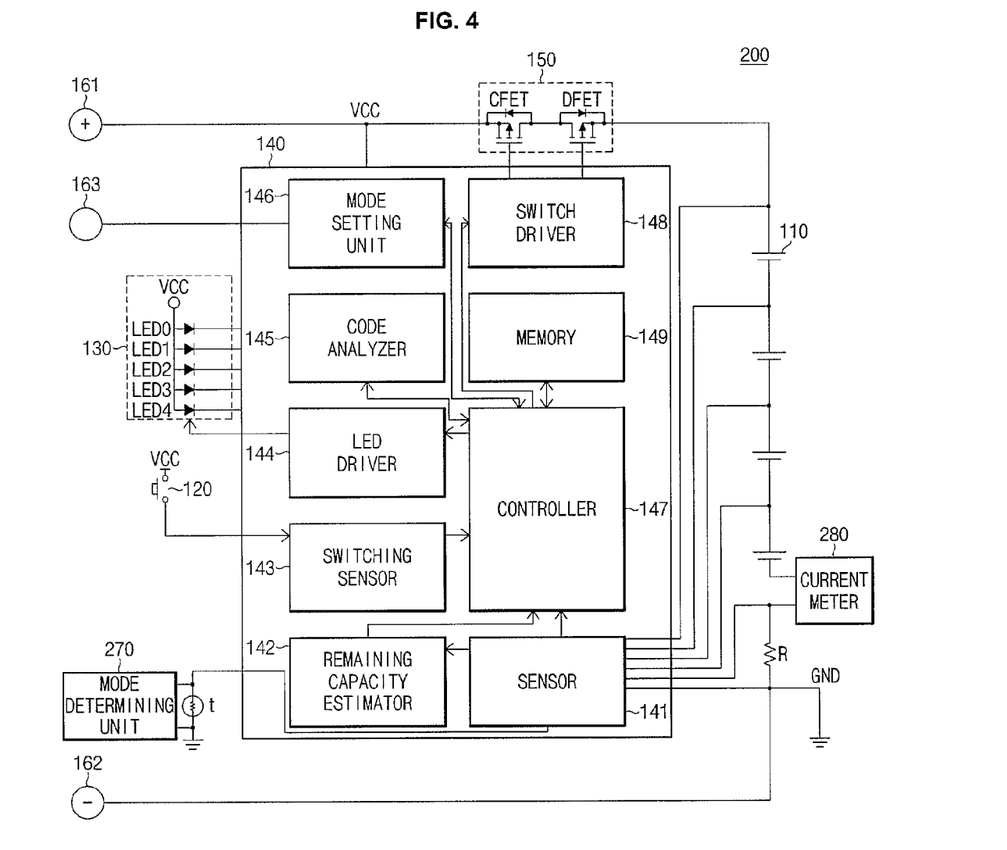
FIG. 4 is a schematic block diagram illustrating a battery pack according to another embodiment of the present invention.

FIG. 4 shows a block diagram of a battery pack according to another embodiment of the present invention.

As illustrated in FIG. 4, the battery pack 200 may include the battery cells 110, the mode switch 120, the LED unit 130, the microcomputer 140, the charge and discharge switches 150, a mode determining unit 270, and a current meter 280. The charge and discharge switches 150 may include a charge switch CFET and a discharge switch DFET. The battery pack 200 may further include a current sense resistor R for sensing the current that flows through the battery cells 110 and a temperature sensor t for measuring temperature. The battery pack 200 further include a positive electrode terminal 161 for charging and discharging the battery cells 110, a negative electrode terminal 162 for charging or discharging the battery cells 110, and a communication terminal 163 for performing communications with an external apparatus.

The battery cells 110, the mode switch 120, the LED unit 130, the microcomputer 140, and the charge and discharge switches 150 of the battery pack 200 are the same as those of the battery pack 100 as illustrated in FIG. 1. Therefore, the description of the battery pack 200 will be concentrated on the mode determining unit 270 and the current meter 280 that are not provided in the battery pack 100.

The mode determining unit 270 is electrically connected to one end and the other end of the temperature sensor t. The mode determining unit 270 may measure waveforms generated between the ends of the temperature sensor t to determine the mode of the battery pack 200. The sensor 141 of the microcomputer 140 may further include an analog-to-digital (A/D) converter for converting analog signals indicating the voltage, current, and temperature of the battery cells 110 into digital signals. The sensor 141 periodically converts the analog signals for the voltage, current, and temperature into the digital signals and transmits the converted digital signals to the controller 147. In the microcomputer 140, current is periodically generated whenever the sensor 141 converts the analog signals into the digital signals. Therefore, when the battery pack 200 is in the normal mode or in the sleep mode, preset waveforms are periodically detected by the mode determining unit 270 that is electrically connected to the temperature sensor t. However, when the battery pack 200 is in the shipping mode, since the microcomputer 140 is turned off, the waveforms are not detected by the mode determining unit 270 that is electrically connected to the temperature sensor t. Therefore, when the waveforms are not detected by the mode determining unit 270, since the battery pack 200 is in the shipping mode, the battery pack 200 may be shipped without changing the mode of the battery pack 200 to the shipping mode after the manufacturing of the battery pack 200.

The current meter 280 is electrically connected between the negative electrode of the battery cells 110 closest to a ground GND and the ground GND. The current meter 280 measures the current consumption of the battery pack 200 when the battery pack 200 is in each mode. The current consumption may be measured by measuring a current that flows through an electrical wire between the positive electrode of the battery cells 110 closest to a first power terminal VCC and the first power terminal VCC by using a current probe. According to one embodiment, the current consumption may be about 200 to about 300 uA/hr when the battery pack 200 is in the normal mode or in the sleep mode, which is a standby state, and may be about 2 to about 3 uA/hr when the battery pack 200 is in the shipping mode, which is the shut-down state. Therefore, when the current consumption of the battery pack 200 measured by the current meter 280 or the current probe is about 2 to about 3 uA/hr, since the battery pack 200 is in the shipping mode, the battery pack 200 may be shipped without switching to change the mode of the battery pack 200 into the shipping mode after its manufacturing.

Although exemplary embodiments of the battery pack of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims and their equivalents.

What is claimed is:

1. A battery pack comprising:
   at least one of battery cells;
   a charge switch;
   a discharge switch;
   a microcomputer for controlling the charge switch and the discharge switch in accordance with a voltage of the battery cells; and
   a mode switch electrically connected to the microcomputer,
   wherein the battery pack has a shipping mode in which the battery pack is configured to be shut down, and a remaining capacity of the battery cells is checked by operating the mode switch.

2. The battery pack of claim 1, wherein the battery pack is configured to enter the shipping mode through operation of the mode switch.

3. The battery pack of claim 1, wherein the charge switch and the discharge switch are configured to be turned off when the battery pack is in the shipping mode.

4. The battery pack of claim 1, wherein, when the battery pack is in the shipping mode, a current consumption of the battery pack is between about 2 uA/hr and about 3 uA/hr.

5. The battery pack of claim 4, further comprising a current probe connected to a first power terminal of the battery pack or a current meter connected between the battery cells and a ground, for measuring the current consumption of the battery pack.

6. A battery pack comprising:
   at least one of battery cells;
   a charge switch;
   a discharge switch;
   a microcomputer for controlling the charge switch and the discharge switch in accordance with a voltage of the battery cells; and
   a mode switch for concurrently turning off the charge switch and the discharge switch,
   wherein a remaining capacity of the battery cells is checked by operating the mode switch.

7. The battery pack of claim 6, wherein the microcomputer is configured to operate with an electric power supplied from a charger when the battery pack is coupled to the charger and turns on the charge switch and the discharge switch so that the battery pack is in a normal mode.

8. The battery pack of claim 6, wherein when the battery pack is in a shipping mode, the battery pack is shut down.

9. The battery pack of claim 8, wherein when the battery pack is in the shipping mode, a current consumption of the battery pack is an amount of self-discharge current that flows through the battery cells in the shipping mode.

10. A battery pack comprising:
    at least one of battery cells;
    a mode switch;
    a discharge switch electrically connected to the battery cells for controlling discharge of the battery cells;
    a charge switch electrically connected to the discharge switch for controlling charging of the battery cells;
    a microcomputer for analyzing codes in accordance with on and off operations of the mode switch to control on and off of the discharge switch and the charge switch,
    wherein a remaining capacity of the battery cells is checked by operating the mode switch.

11. The battery pack of claim 10, further comprising a light emitting diode unit configured to be turned on in accordance with a switching operation of the mode switch to display a remaining capacity of the battery cells.

12. The battery pack of claim 11, wherein the microcomputer comprises:
    a switching sensor for sensing a switching signal of the mode switch;
    a light emitting diode (LED) driver for driving the light emitting diode unit in accordance with the switching signal sensed by the switching sensor to emit light;
    a code analyzer for analyzing the switching signal of the mode switch;
    a mode setting unit for setting a mode of the battery pack in accordance with a result analyzed by the code analyzer;
    a switching driver for operating the charge switch and the discharge switch in accordance with the mode set by the mode setting unit; and
    a controller for controlling the LED driver to generate a lighting signal of the light emitting diode unit in accordance with the signal sensed by the switching sensor, controlling the mode setting unit in accordance with the result analyzed by the code analyzer, and controlling the switching driver in accordance with the mode set by the mode setting unit.

13. The battery pack of claim 12, wherein the microcomputer further comprises:
    a sensor for sensing voltage, current, and temperature of the battery cells;
    a remaining capacity estimator for estimating the remaining capacity of the battery cells in accordance with the voltage, current, and temperature sensed by the sensor; and
    a memory for storing the voltage, current, and temperature sensed by the sensor.

14. The battery pack of claim 12, wherein the controller is configured to set the mode of the battery pack to a shipping mode by utilizing the mode setting unit when a code analyzed by the code analyzer is equal to a code stored in the controller.

15. The battery pack of claim 12, wherein the controller is configured to turn off the discharge switch and the charge switch by utilizing the switch driver when the battery pack is in a shipping mode.

16. The battery pack of claim 12, wherein the battery pack is in a sleep mode when the charge switch and the discharge switch are turned on.

17. The battery pack of claim 16, wherein an electric power is supplied to the microcomputer from the battery cells via the discharge switch and the charge switch in the sleep mode.

* * * * *